US008566752B2

(12) United States Patent
Piersol et al.

(10) Patent No.: US 8,566,752 B2
(45) Date of Patent: Oct. 22, 2013

(54) PERSISTENT SELECTION MARKS

(75) Inventors: Kurt Piersol, Menlo Park, CA (US);
Gabriel Johnson, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 1111 days.

(21) Appl. No.: 11/963,170

(22) Filed: Dec. 21, 2007

(65) Prior Publication Data

US 2009/0164889 A1 Jun. 25, 2009

(51) Int. Cl.
*G06F 17/27* (2006.01)
(52) U.S. Cl.
USPC .............................. 715/862; 715/231; 715/233
(58) Field of Classification Search
USPC .......... 715/231, 502, 200, 236, 862; 345/173, 345/661
See application file for complete search history.

(56) References Cited

U.S. PATENT DOCUMENTS

| | | | |
|---|---|---|---|
| 5,880,743 A * | 3/1999 | Moran et al. | 345/473 |
| 6,212,297 B1 * | 4/2001 | Sklarew | 382/189 |
| 6,891,551 B2 * | 5/2005 | Keely et al. | 715/762 |
| 6,938,222 B2 * | 8/2005 | Hullender et al. | 715/863 |
| 7,103,848 B2 * | 9/2006 | Barsness et al. | 715/776 |
| 2003/0020834 A1 | 1/2003 | Gomikawa | |
| 2003/0081931 A1 | 5/2003 | Nanba | |
| 2004/0078757 A1 * | 4/2004 | Golovchinsky et al. | 715/512 |
| 2004/0143796 A1 * | 7/2004 | Lerner et al. | 715/538 |
| 2005/0055628 A1 * | 3/2005 | Chen et al. | 715/512 |
| 2006/0001656 A1 * | 1/2006 | LaViola et al. | 345/179 |
| 2006/0066591 A1 | 3/2006 | Marggraff et al. | |
| 2006/0067577 A1 | 3/2006 | Marggraff et al. | |
| 2007/0115264 A1 * | 5/2007 | Yu et al. | 345/173 |

FOREIGN PATENT DOCUMENTS

| | | |
|---|---|---|
| EP | 1174801 A | 1/2002 |
| EP | 1486883 A2 | 12/2004 |
| JP | 2003-46960 | 2/2003 |
| JP | 2007206697 | 8/2007 |

OTHER PUBLICATIONS

Schilit, Bill N., et al., "Beyond Paper: Supporting Active Reading with Free Form Digital Ink Annotations", CHI '98, Human Factors in Computing Systems, Apr. 1998, pp. 249-256, New York, NY, USA.
European Search Report for European Patent Application No. EP 08171943, dated Oct. 30, 2009, 8 pages.
Alvarado, C., et al., "Resolving Ambiguities to Create a Natural Sketch Based Interface",*Proceedings of IJCAI-2001*, (2001), (18 pgs.).

(Continued)

*Primary Examiner* — Doug Hutton, Jr.
*Assistant Examiner* — Brian Garmon
(74) *Attorney, Agent, or Firm* — Blakely, Sokoloff, Taylor & Zafman LLP

(57) ABSTRACT

Methods and method and apparatus are disclosed herein for marking electronic documents with one or more persistent selection marks. In one embodiment, the method comprises receiving input representing one or more marks on a document image; determining whether the one or more marks represents a selection of a persistent selectable area that delineates information in the document image; and storing data corresponding to the selection to enable a user in the future to obtain the information in the document image by performing an action with respect to the one or more marks.

20 Claims, 10 Drawing Sheets

(56) References Cited

OTHER PUBLICATIONS

Cole, R, et al., "Survey of the State of the Art in Human Language Technology", Pittsburgh PA, *Center for Spoken Language Understanding CSLU, Oregon Graduate Institute*, (1995), (502 pgs.).

Hammond, T., et al., "Ladder, a Sketching Language for User Interface Developers", *Elsevier, Computers and Graphics*, 29, 518-532, (2005), (15 pgs.).

Johnson, G., et al., "Flow Selection: A Time-Based Selection and Operation Technique for Sketching Tools", *Conference on Advanced Visual Interfaces*, Venice, Italy, (2006), (4 pgs.).

Kara, L. B., et al., "Hierarchical Parsing and Recognition of Hand-Sketched Diagrams", *Proceedings of the 17th Annual ACM Symposium on User Interface Software and Technology*, Santa FE, NM, USA, ACM Press., (2004), (10 pgs.).

Kurtenbach, G., et al., "Issues in Combining Marking Menus and Direct Manipulation Techniques", *Symposium on User Interface Software and Technology. ACM*, (1991), (8 pgs.).

Landay, J. A., et al., "Informal PUIs: No Recognition Required.", *AAAI 2002 Spring Symposium (Sketch Understanding Workshop)*. Stanford, CA., (2002), (5 pgs).

Lebling, D., et al., "Zork: A Computerized Fantasy Simulation Game", *IEEE Computer*, 12, 51-59, (1979), (9 pgs.).

Long, A. C., et al., "Quill: A Gesture Design Tool for Pen-Based User Interfaces", Berkeley, California, *University of California, Berkeley.*, (2001), (8 pgs.).

Saund, E., et al., "Stylus Input and Editing without Prior Selection of Mode", *Proceedings of the 16th Annual ACM Symposium on User Interface Software and Technology*, Vancouver, Canada, ACM Press, (2003), (4 pgs.).

Suchman, L., "Plans and Situated Actions: The Problem of Human-Machine Communication", New York, *Cambridge University Press.*, (1987), (163 pgs.).

Walker, R., "The Old New Thing.", New York, NY, *The New York Times.*, (2004), (2 pgs.).

Weiser, M. , "The Computer for the 21st Century.", *Scientific American.*, (1991), (8 pgs.).

\* cited by examiner

Here is a paragraph of text for example use. It is remarkably devoid of useful content, and can be safely ignored.

Figure 6A

Here is a paragraph of text for example use. It is remarkably devoid of useful content, and can be safely ignored.

Figure 6B

Here is a paragraph of text for example use. It is remarkably devoid of useful content, and can be safely ignored.

Figure 7A

Here is a paragraph of text for example use. It is remarkably devoid of useful content, and can be safely ignored.

Figure 7B

Here is a paragraph of text for example use. It is remarkably devoid of useful content, and can be safely ignored.

Figure 7C

PERSISTENT SELECTION MARKS

FIELD OF THE INVENTION

The present invention relates to the field of document processing; more particularly, the present invention relates to adding and using marks to a document to delineate content in the document to enable subsequent selection in the future.

BACKGROUND OF THE INVENTION

Systems for sketching are an established art in computers. Tablet personal computers (PCs) are the latest in a long series of pen-based computers, which includes the Apple Newton of Apple Computer of Cupertino, Calif., the Palm Pilot of Palm Inc. of Sunnyvale, Calif. and the Go pen-based computer. Tablet input devices are used for a wide array of artistic endeavors, most notably with the Corel program Painter and Adobe Photoshop.

Pen systems are in general optimized for the creation of content via pen. However, when examining typical office activity, the pens are actually only seldom used for such activities. Particular populations, such as researchers, take extensive notes via pen. Most clerical office workers, and indeed most manufacturing, marketing, and sales workers seldom take extensive pen-based notes. Instead, pens are used to annotate and modify pre-existing content. For example, standardized forms are filled out, white paper drafts are reviewed, and reports are signed.

One form of annotation is the delineation of specific regions of the content. For example, is it quite common to underline words or phrases. Circling or boxing particular paragraphs or words is also quite common. Bracketing is widely used to make less obtrusive marks. Such marks are forms of selection, similar to the ordinary sweep selection used in most word processor programs today. However, unlike the selections made in a word processor, which are typically made for the selector as a prelude to performing an action, pen-based annotations are often a selection intended for someone else.

A concrete example is useful. Suppose an executive, Phil, is reviewing the yearly financial report. He notes a serious problem with the financial figures for one particular page. He would like to have his CFO, Bob, take a look at the particulars. He marks the areas of interest on the page with a pen, and writes a small note about the perceived problem. He then passes the document to his secretary, with a note saying "Please send a clean copy of these pages with a note from me to the board members, and then get me a meeting with Bob." Such an interaction works well with pen and paper. However, attempting to do the same with an electronic system involves one of several unpleasant choices. Phil might print and mark the document, but then the CFO may have a hard time finding the electronic original. Phil might learn how to add "sticky notes" comments to the document. This almost never occurs in practice, because Phil always finds it easier to just do it the hard way once, rather than learning a new feature of the specific program in use.

There are numerous pen based computing projects, covering most aspects of ephemeral selection, gesture recognition, and pen annotation. Furthermore, there are many ephemeral selection methods, comprising the usual array of gestures such as marquee selection, sweep selection, and so on.

Margraff et al., U.S. patent application Ser. No. 11/034, 491, entitled "Method and System for Implementing a User Interface for a Device Employing Written Graphical Elements", filed on Jan. 12, 2005 and U.S. patent application Ser. No. 11/035,155, entitled "Method and System for Implementing a user Interface for a Device Through Recognized Text and Bounded Areas," filed on Jan. 12, 2005, cover the idea of making persistent marks which are action verbs, and taking the specified actions based on tapping of the persistent marks.

SUMMARY OF THE INVENTION

Methods and apparatuses are disclosed herein for marking electronic documents with one or more persistent selection marks. In one embodiment, the method comprises receiving input representing one or more marks on a document image; determining whether the one or more marks represents a selection of a persistent selectable area that delineates information in the document image; and storing data corresponding to the selection to enable a user in the future to obtain the information in the document image by performing an action with respect to the one or more marks.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 6A illustrates an example of underlining.

FIG. 6B illustrates an example of circling text as part of a scope mark.

FIG. 7A illustrates an example of using two corner marks on opposite ends of a paragraph.

FIG. 7B illustrates an example where two potential "begin" marks and a single "end" mark are used.

FIG. 7C is an example of an annotation with a command.

DETAILED DESCRIPTION OF THE PRESENT INVENTION

Methods and apparatuses for creating and using marks to an electronic document with a pen intended to delineate selectable areas of the electronic documents are described. In one embodiment, a method for marking electronic documents with a pen includes detecting shapes which represent persistent selectable areas, and retains this information without alteration of the marks or action, and then performing the appropriate selection when the mark is tapped subsequently. In another embodiment, the method includes applying one or more nearby persistent action marks to such a selection when the action mark is tapped. In one embodiment, the method includes storing selection specific additional information for the action.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Figure 12:
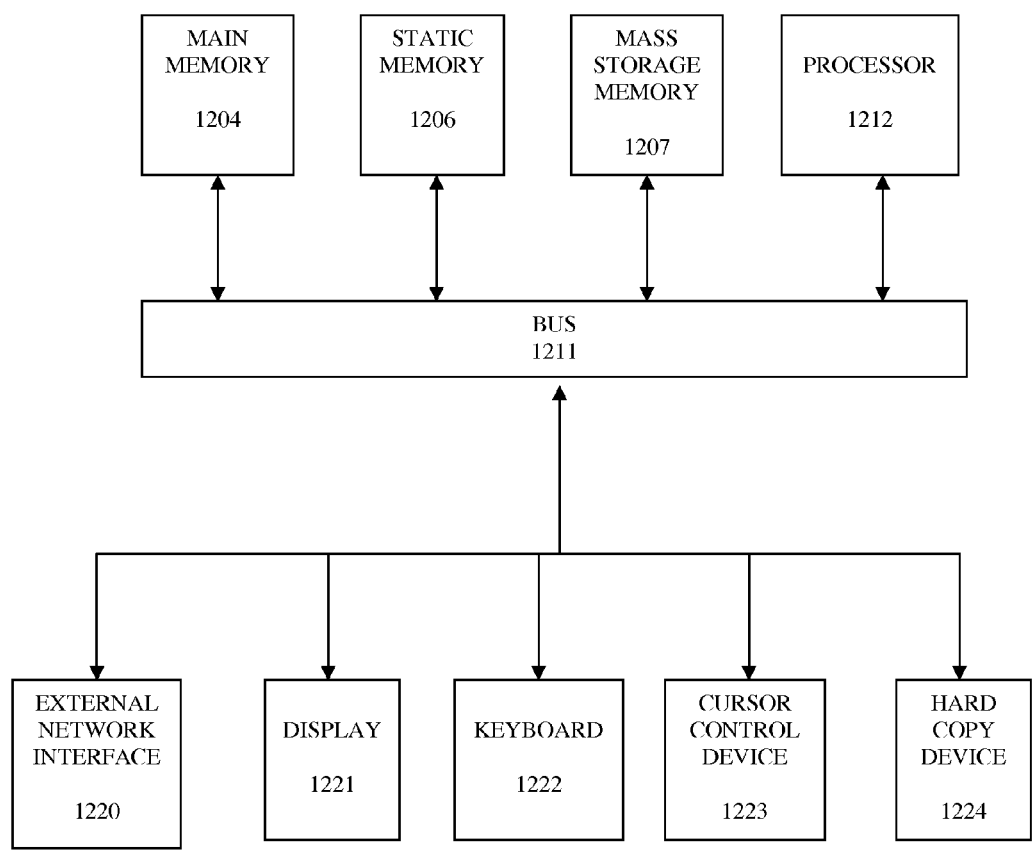
FIG. 12 is a block diagram of an exemplary computer system that may perform one or more of the operations described herein.

FIG. 12 is a block diagram of an exemplary computer system that may perform one or more of the operations described herein. Referring to FIG. 12, computer system 1200 may comprise an exemplary client or server computer system. Computer system 1200 comprises a communication mechanism or bus 1211 for communicating information, and a processor 1212 coupled with bus 1211 for processing information. Processor 1212 includes a microprocessor, but is not limited to a microprocessor, such as, for example, PENTIUM™, POWERPC™, ALPHA™, etc.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A pen based system for annotating document page images is described. In one embodiment, each page image may be generated by a device or a system such as, for example a scanner or print capture system. Note that for purposes herein, there is a distinction between a set of base content such as a page image, and pen-based annotations made to the base content. The annotation of the document page images is used to delineate one or more areas of its content, as opposed to altering that base content.

Figure 1:
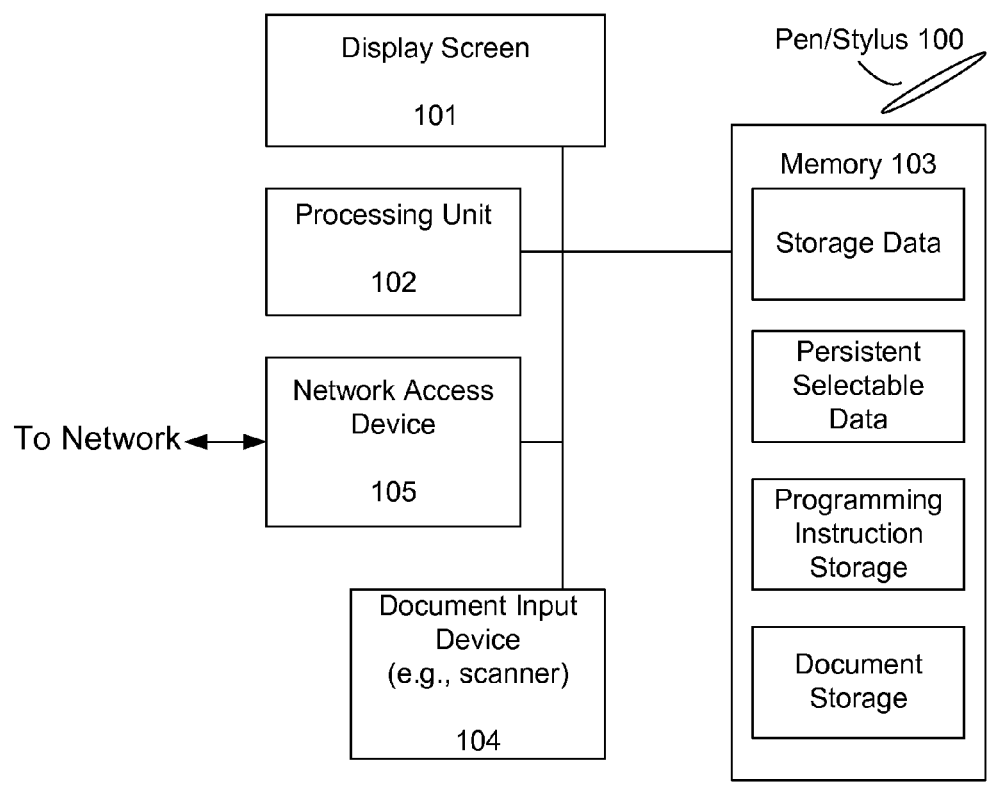
FIG. 1 is a block diagram of one embodiment of a system for annotating document page images.

FIG. 1 is a block diagram of one embodiment of a system for annotating document page images. Referring to FIG. 1, the system comprises a pen/stylus 100, a display screen 101, a processing unit 102, memory 103, a document input device (e.g., scanner) 104, a network access device 105.

A document is loaded into the system and stored in memory 103. In one embodiment, the document is loaded in to the system by providing a raster image of a page along with an XML file that describes the bounding boxes and textual values of any words or similar page objects. This may be input into the system via network access device 105. Alternatively, a document input device (e.g., scanner) 104 may be used to input documents, which are stored in memory 103.

In one embodiment, the system does not attempt to work with images; in alternative embodiments, similar techniques are used with images. The image and bounding boxes are then loaded together into a Page data structure that is stored in memory 103. In one embodiment, the page's coordinate system is scaled to fit the available screen size. In one embodiment, all input from the pen or mouse is scaled by the proportional amount.

While the system of FIG. 1 has capabilities for annotating a page image and for displaying an annotated page image, in alternative embodiments, two systems may perform these functions separately.

The document may be viewed on display screen 101. While being displayed, pen/stylus 100 or a mouse device (not shown) may be used to interact with the document image on display screen 101. Such interaction includes making and/or selecting persistent selection marks to delineate persistent selectable areas in a document as described herein. Processing unit 102 process those inputs as described below based on instructions stored in memory 103. The marks, as well as persistent selectable area data are stored in memory 103 as well. Memory 103 may comprise one or more memories.

Figure 2:
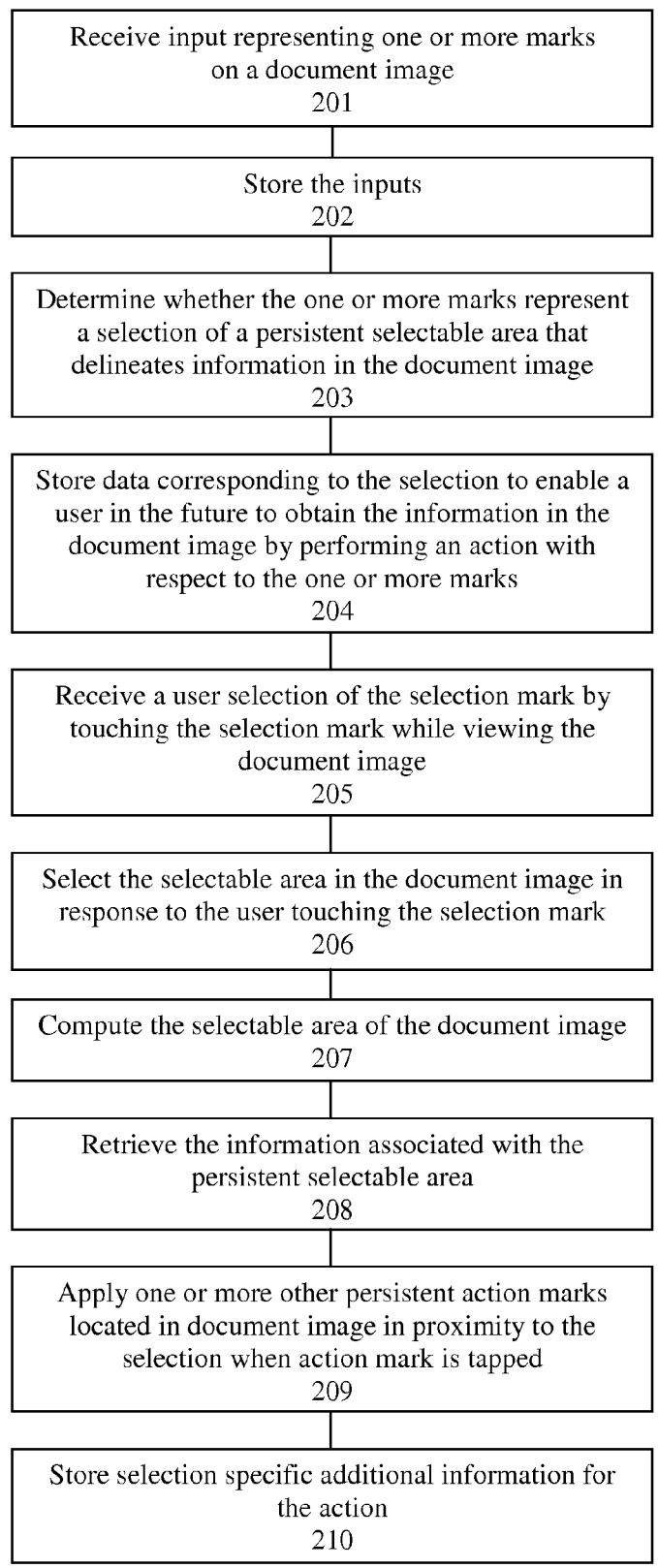
FIG. 2 is a flow diagram of one embodiment of a process for marking an electronic document with a pen.

FIG. 2 is a flow diagram of one embodiment of a process for marking an electronic document with a pen. The process is performed by processing logic that may comprise hardware (e.g., circuitry, dedicated logic, etc.), software (such as is run on a general purpose computer system or a dedicated machine), or a combination of both.

Referring to FIG. 2, the process begins by processing logic receiving input representing one or more marks on a document image (processing block 201). In one embodiment, receiving input representing one or more marks on a document image comprises detecting one or more shapes that represent the persistent selectable area. In one embodiment, the marks comprise pen strokes. In one embodiment, receiving inputs comprises recording a plurality of pen strokes and a plurality of time stamps, with a distinct one of the plurality of time stamps corresponding to a distinct one of the plurality of strokes.

Processing logic stores the inputs (e.g., marks, pen strokes, etc.) (processing block 202).

After receiving the marks, processing logic determines whether the one or more marks represent a selection of a persistent selectable area that delineates information in the document image (processing block 203). In one embodiment, the information comprises a portion of text. Processing logic stores data corresponding to the selection to enable a user in the future to obtain the information in the document image by performing an action with respect to the one or more marks (processing block 204).

Subsequently, processing logic receives a user selection of the selection mark by touching the selection mark while viewing the document image (processing block 205). In one embodiment, the user selecting the selection mark comprises receiving an indication that the user has tapped on at least one of the one or more marks.

After receiving the user's selection, processing logic selects the selectable area in the document image in response to the user touching the selection mark (processing block 206) and computes the selectable area of the document image (processing block 207). Thereafter, processing logic retrieves the information associated with the persistent selectable area (processing block 208).

Optionally, processing logic applies one or more other persistent action marks located in the document image in proximity to the selection when the action mark is tapped (processing block 209).

Finally, processing logic stores the selection specific additional information for the action (processing block 210).

Mouse and Pen Events

Figure 3:
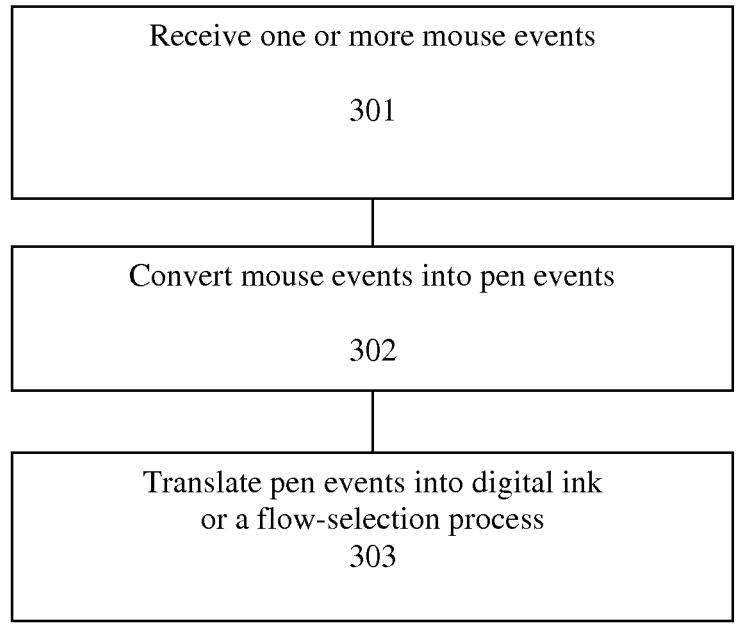
FIG. 3 is a flow diagram of one embodiment of a process for processing mouse events.

In one embodiment, the system converts mouse events to pen events. FIG. 3 is a flow diagram of one embodiment of a process for processing mouse events. The process is performed by processing logic that may comprise hardware (e.g., circuitry, dedicated logic, etc.), software (such as is run on a general purpose computer system or a dedicated machine), or a combination of both.

Referring to FIG. 3, the process begins by receiving one or more mouse events (processing block 301). Processing logic converts the received mouse events such as, for example, move, down, up, and drag, into pen events (processing block 302). In one embodiment, the pen events include "idle", "move", "down", "up", and "flow". This is advantageous for two reasons. The first is of practical necessity: using a stylus causes mouse-move and drag events to be generated when they would not have been generated with a normal mouse. The second reason is to reinforce the restrictions that less sophisticated devices will impose. In other words, cheaper pen surface will not detect passive stylus movement, so this information is intentionally dropped from the model.

Subsequent to converting received mouse events into pen events, processing logic translates pen events into the creation of digital ink, or in the case of a prolonged pen hold a flow-selection process (processing block 303). In one embodiment, the translation into the flow-selection process is performed as described in Johnson, et al., Flow Selection: A Time-Based Selection and Operation Technique for Sketching Tools. 2006 Conference on Advanced Visual Interfaces, Venice, Italy.

High-Level Interpretation Scheme

In one embodiment, the system distinguishes three different kinds of digital ink: annotation, scope, and command types. The identity of digital ink is determined with a recognition process that incorporates ideas from two other recently developed processes. These ideas are examples of 'grouping' and 'recognizing' which taken together with page content are referred to herein, at a high level, as 'interpreting'.

In one embodiment, related ink strokes are grouped based on the time they were applied. This makes sense for document annotation, which is characterized by long periods of inactivity punctuated with logically related ink strokes. In one embodiment, if the time that the pen is inactive is less than the length of time the previous ink stroke took to complete (up to a limit, the two most recent ink strokes are included in the same group. For example, 1 second is a limit that may be used, representing a duration beyond which a human is likely to have intentionally paused, rather than simply have been moving the pen unconsciously.

In alternative embodiments, more sophisticated grouping techniques involve looking at the distance the pen must travel from the last pen-up location to a new stroke's pen-down location, and apply Fitt's law to determine if the second stroke was begun in a reasonable amount of time to assume the two marks are related. In another embodiment, the grouping module also takes suggestions from a higher lever recognizer and adapts dynamically depending on what kind of content is being sketched.

Figure 4:
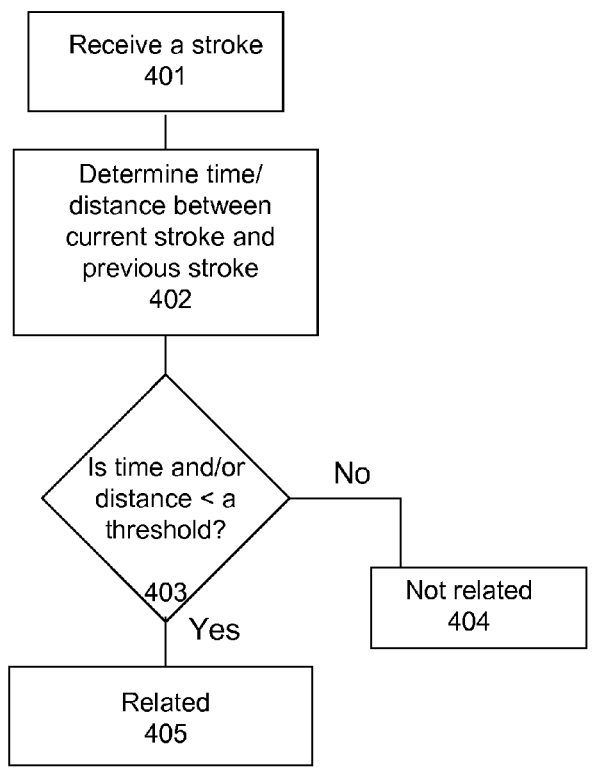
FIG. 4 is a flow diagram of one embodiment of a process for grouping related ink strokes.

FIG. 4 is a flow diagram of one embodiment of a process for grouping related ink strokes. The process is performed by processing logic that may comprise hardware (e.g., circuitry, dedicated logic, etc.), software (such as is run on a general purpose computer system or a dedicated machine), or a combination of both. Referring to FIG. 4, the process begins with processing logic receiving a stroke (i.e., the current stroke) (processing block 401). In response to receiving a stroke, processing logic determines the time and distance between the current stroke and the stroke received immediately before the current stroke (processing block 402). Processing logic then determines if the time and/or the distance between the current stroke and the previous stroke is less than a threshold (processing block 403). In one embodiment, the threshold is the time to complete the previous ink stroke. If the time and/or the distance between the current stroke and the previous stroke is not less than a threshold, then processing logic determines the strokes are not related and does not group them together (processing block 404). If the time and/or the distance between the current stroke and the previous stroke is less than a threshold, then processing logic determines the current stroke and the previous stroke are related and groups them together (processing block 405). Thereafter, processing logic transitions back to processing block 401 to process the next stroke.

For the second aspect of recognition, the system continually analyses groups of ink strokes as the grouping module identifies them and attempts to make sense of the current state of the ink, regardless of what the prior state was. This is to allow for newer, better interpretations (e.g., additional stroke recognitions) as more information becomes available.

Figure 5:
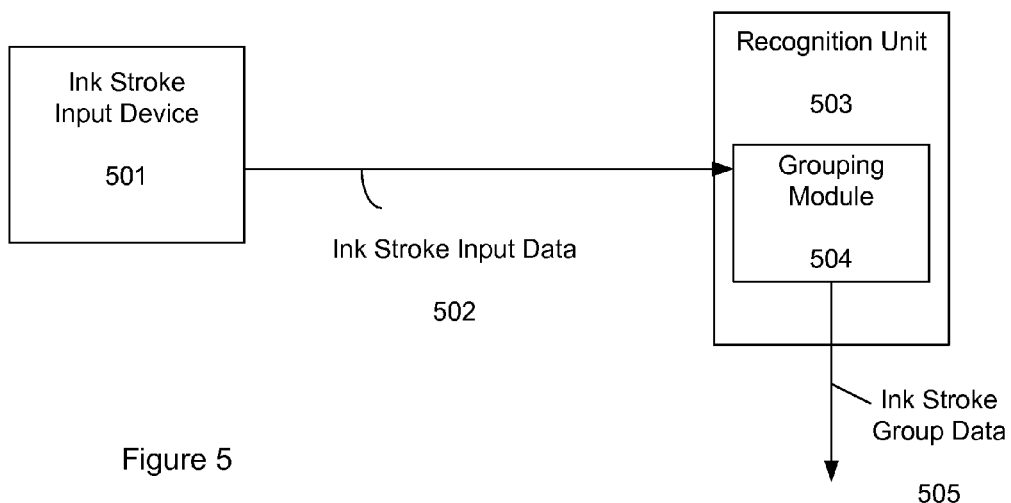
FIG. 5 is a block diagram of one embodiment of a stroke recognition module.

FIG. 5 is a block diagram of one embodiment of a stroke recognition module. Such a module may be in the processing unit of the system in FIG. 1. Note also that the recognition module may be implemented in hardware (e.g., circuitry, dedicated logic, etc.), software (such as is run on a general purpose computer system or a dedicated machine), or a combination of both.

Referring to FIG. 5, an ink stroke input device 501 (e.g., a tablet for use with a stylus or pen-based device) generates ink stroke inputs 502. Ink stroke inputs 502 are input to recognition engine 503. Recognition engine 503 includes a grouping module 504 that determines whether to group one or more ink strokes together. As an output, grouping module 504 outputs information 505 indicative of which ink strokes are to be grouped together.

Scope Marks and Selections

A common activity with printed document content is to apply ink to the page in the capacity of delimiting words, sentences, paragraphs, and so on. The reason for doing this varies by person and situation. Sometimes it is to help the reader dissect the meaning of the literature, other times it is to call out attention to particular sections for other people or to associate with some handwritten comment. For purposes herein, this kind of ink is referred to as for delineating words, sentences, paragraphs, or other document content scope marks.

In one embodiment, scope marks in the system are multi-functional. They communicate to the user and others that the scoped out content is particularly salient. In this sense, it is simply ink in the traditional sense: purely visual, with meaning derived entirely by the human viewing it. One embodiment of the system of the present invention also holds scope marks to be syntactically relevant as well. Users may select content by tapping on or near existing scope marks. Scoped out text also serves as the object of a command (discussed in more detail below).

Any of a variety of marks can serve as scope marks. For example, underlining a word or phrase is a natural scope mark for a short sequence. FIG. 6A illustrates an example of underlining. Circling a paragraph, word, or row or column of a table are also natural gestures. FIG. 6B illustrates an example of circling text as part of a scope mark. In one embodiment, all such marks are used because the system is configured (e.g., programmed) to recognize them.

In one embodiment, some scope marks are disjoint. For example, two corner marks may be used to delineate the beginning and end of a sequence of text. To delimit the proper selected text, the reading order conventions of the language in which the system is working are used, as well as word bounding boxes. FIG. 7A illustrates an example of using two corner marks on opposite ends of a paragraph. In one embodiment, the direction "inside" each mark is determined by computing a direction of curvature for the stroke as a whole. In one embodiment, a pair of such marks is used begin and end markers.

In the case of disjoint selection, both temporal and spatial grouping is used to disambiguate collections of marks. FIG. 7B illustrates an example where two potential "begin" marks and a single "end" mark are used. If the user taps on either of the begin marks, the result seems fairly unambiguous. However, in the case of the end mark, in one embodiment, time and/or spatial extent is used to disambiguate. In one embodiment, both are used. In one embodiment, if the outermost end mark was made quite recently (e.g., within 15 seconds), that mark is used in preference to the inner mark. This logic behind this is simply because the user probably made it for selection purposes and remembers this fact. After a sufficient time, (e.g., within 15 seconds) or if it is known that the document has been closed and reopened since making the marks, then it is much less likely that the user remembers making the outer mark, and is most likely to expect the inner mark. Note that the beginning and end marks might be on different pages of the document, and might be nested or even cross one another.

Annotation and Command Marks

In one embodiment, by default, all user-provided ink is assumed to be unparsed annotation. If a recognizer (e.g., recognition unit or module) asserts that ink is a scope mark or a command, its identity is elevated. This should not reduce the importance of simple annotations, however. The power of sketching interfaces lies in allowing the user to put ink wherever is deemed appropriate without imposing limitations such as unwarranted recognition.

In one embodiment, annotations are interpreted as a command if a recognizer returns a high confidence value and if the context for such a command makes sense. In one embodiment, the system implements one command, which is drawn in the manner of a capital 'G' (although any manner of drawing may be used). This command is to simulate a dictionary lookup. For example, if a user is reading a page and encounters an unfamiliar word, they may look up the definition of that word by underlining it and writing 'G' somewhere near it. FIG. 7C is an example of such an annotation. A large number of such commands can be added. For example, but not limited to, P—print the extracted selection as document; F—forward the extracted selection in an email message; and S—save to a database of useful quotes, along with the document identifying information.

In one embodiment, the system performs the operations of recognition and action usually separated in time. Annotations can proceed undisturbed, even if the system recognizes an annotation as a potential scope mark or action. By making a selection using a scope mark, and annotating over the selection, a short mode of immediate action is entered, and, as soon as a mark is made away from the selection, the system immediately switches back into the annotation mode.

One of the advantages of this approach is that persistent examples of working command gestures are left visible on the page. This will allow users to discover and remember many more gestures than might otherwise be possible. Gestures in common use in a work group will tend to appear over and over on pages, making it easy for new members to discover the gestures and existing users to remember them. Gesture discovery is one of the long-term issues with gesture and pen systems, and this particular approach has an elegant answer to this issue.

One Embodiment of the System

In one embodiment, there are three hand-coded recognizers used in the system that implement the recognition operation: underline (a scope mark), circle (another scope mark), and a 'G' command used to specify an action on a nearby scope mark.

Scope marks can be applied by tapping the pen near them. In one embodiment, nearness is a measure of the minimal distance from the pen tap point to all scope marks on the screen. A tap is considered to be close enough if it is within some threshold value, measured in pixels. In one embodiment, 20.0 pixels are as the nearness threshold, but any predefined number of pixels or other distance measure may be used.

Applying a scope mark has the effect of selecting all content associated with that scope mark. Each individual scope mark (underline and circle, in one embodiment) have its own method(s) for determining membership in the set of selected content.

Underline

Underlines may be single-stroke or multi-stroke. In one embodiment, an individual stroke is considered to be an underline if it's bounding box aspect ratio is very small:

---

Bounding box = smallest rectangle containing all points of ink stroke
Aspect ratio confidence = $1.0 - ((\text{bounding box height}) / (\text{bounding box width}))$ In one embodiment, a group of ink (which may consist of one or more ink strokes) is considered to be an underline if all ink strokes have an aspect ratio below some critical threshold (e.g., 0.85). The aspect ratio confidence is simply one minus the ratio of box height and box width because it serves to give a value that approaches 1.0 for perfectly flat lines.

Application of underlines works by looking at the nearness (as defined above) of content bounding boxes to the underline. For purposes of comparison, each stroke in an underline scope mark is averaged in the y-dimension to form a perfectly flat line, though this is only for use in determining membership in a selection and is at no point visually echoed to the user. This point is called the underline y-average.

It is assumed that human users will not have the best aim and will occasionally make their underlines on top of their intended targets. For this reason, a cutoff for determining if an underline is 'below' a content object's bounding box is used. In one embodiment, the cutoff is at a point 40% of the object's height from it's lower bound. This is called the y-cutoff.

One algorithm for membership in underline scoping is as follows. First, determine which content item's y-cutoff is closest to the underline y-average while remaining above it. This requires looking at all content areas. For purposes herein, this object is called y-closest. Next, examine all content that is above the underline, looking at both the x and y dimensions. If a content bounding box's x-dimension span is 40% contained in the underline's x-dimension span, and the content box's y dimension's bottom is between the top of y-closest and the underline, it is included in the selection. This process is repeated for all component ink strokes of the underline group.

One Embodiment of a Process for Recognizing a Stoke as an Underline

Figure 8:
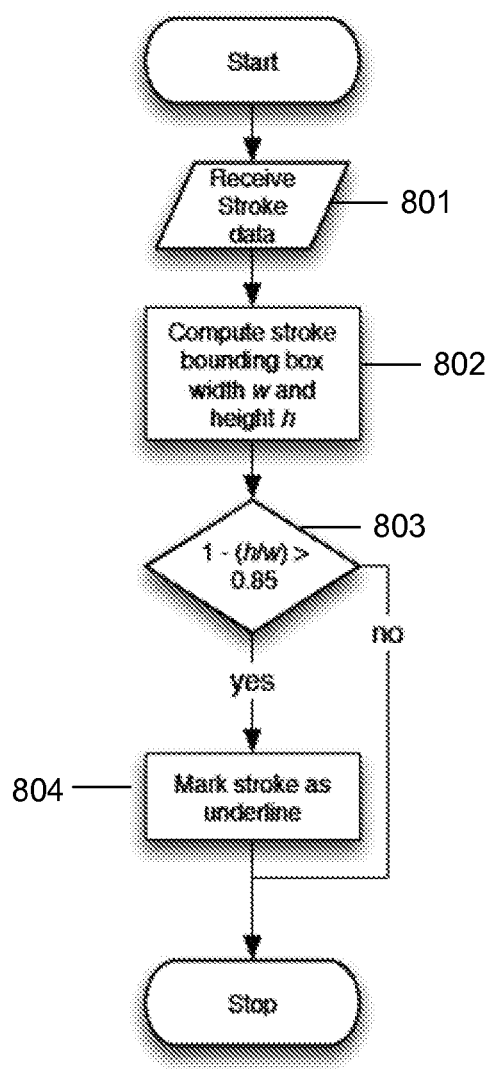
FIG. 8 is a flow diagram of one embodiment of a process for recognizing a stroke as an underline mark.

FIG. 8 is a flow diagram of one embodiment of a process for recognizing a stroke as an underline mark. The process is performed by processing logic that may comprise hardware (e.g., circuitry, dedicated logic, etc.), software (such as is run on a general purpose computer system or a dedicated machine), or a combination of both.

Referring to FIG. 8, the process begins by processing logic receiving stroke data (processing block 801). Using the stroke data, processing logic computes a stroke bounding box of width w and height h (processing block 802). Next, processing logic tests whether $$1-(h/w)<0.85.$$

If not, the process ends. If it is, processing logic marks the stroke as an underline (processing block 804) and the process ends.

Pseudocode for One Embodiment of an Underline Recognition Process

```
def get_underline_confidence(ink_stroke):
    box = ink_stroke.bounding_box
    if (box.height > box.width):
        return 0
    aspect = box.height / box.width
    if aspect < 0.85:
        confidence = 0
    else:
        confidence = 1 - aspect
    return confidence
def recognize_underline (ink_group):
    confidence_sum = 0
    for ink_stroke in ink_group:
        v = get_underline_confidence(ink_stroke)
        if (v > 0):
            confidence_sum += v
        else:
            confidence_sum = 0
            break
    if confidence_sum > 0:
        return confidence_sum / ink_group. size
    else return 0
```

One Embodiment of a Process for Selecting Content from Underline Strokes

Figure 10:
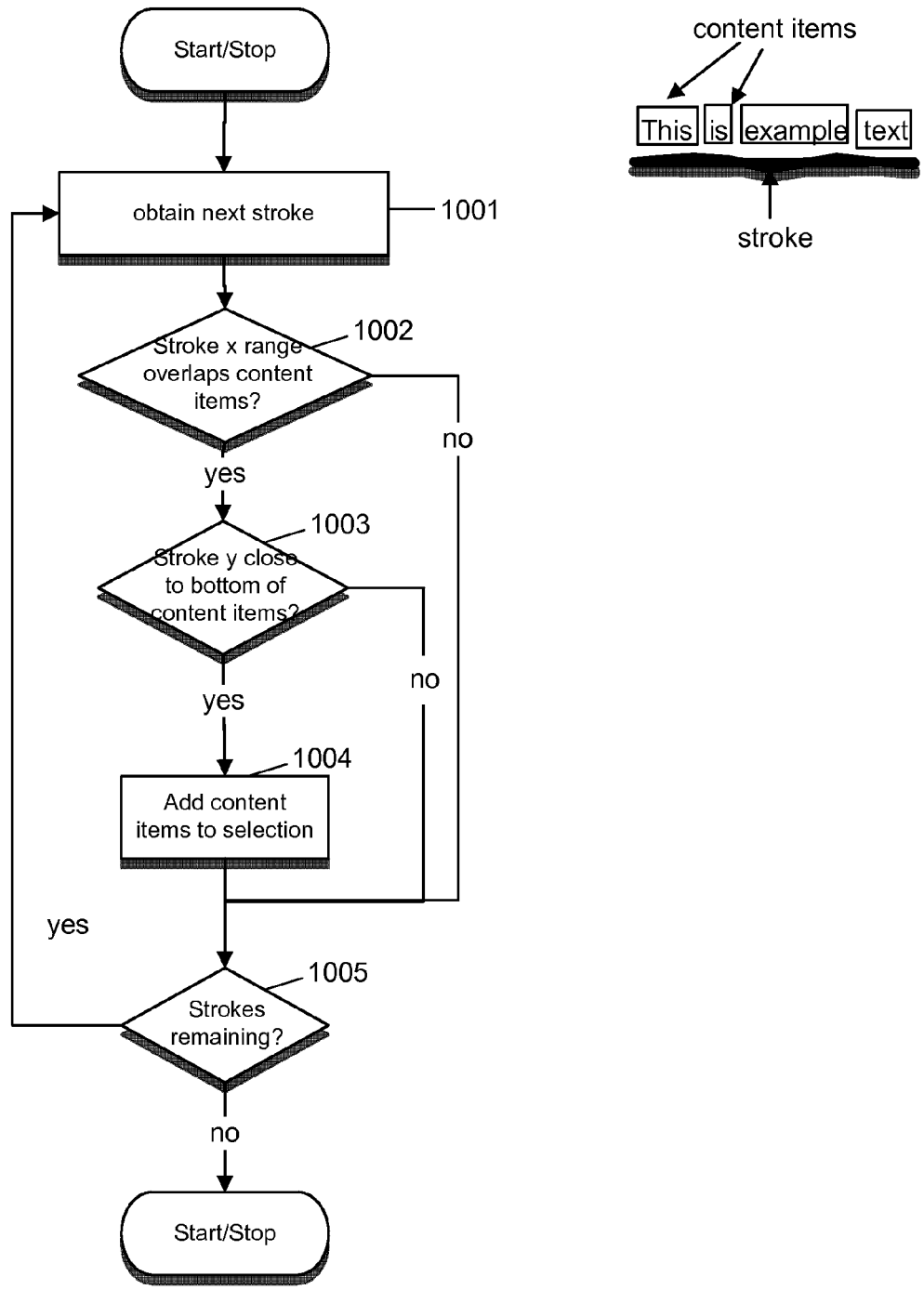
FIG. 10 is a flow diagram of one embodiment of a process for selecting content from underlined strokes.

FIG. 10 is a flow diagram of one embodiment of a process for selecting content from underlined strokes. The process is performed by processing logic that may comprise hardware (e.g., circuitry, dedicated logic, etc.), software (such as is run on a general purpose computer system or a dedicated machine), or a combination of both.

Referring to FIG. 10, the process begins by processing logic obtaining the next stroke (processing block 1001). With the next stroke, processing logic determines whether the stroke x range overlaps content items (processing block 1002). If not, the process transitions to processing block 1005. If it does, then processing logic determines whether stroke y is close to the bottom of the content items (processing block 1003). If stroke y is not close to the bottom of the content items, then the process transitions to processing block 1005. If stroke y is close to the bottom of the content items, processing logic adds the content items to the selection (processing block 1004) and the process transitions to processing block 1005.

At processing block 1005, processing logic determines whether there are any strokes remaining. If so, the process transitions to processing block 1001, and the process repeats. If not, the process ends.

Pseudocode for One Embodiment of an Underline Application

```
def apply_underline (underline, all_content):
    contenders = empty list
    closest_content = nil
    closest_dist = infinity
    for stroke in underline:
        for content in all_content:
            if (stroke.x_range( ) overlaps content.x_range( )) and
            (stroke.ave-y < content.y_cutoff):
                contenders.add(content)
                if stroke.ave-y – content.y_cutoff < closest_dist:
                    closest_dist = stroke.ave-y – content.y_cutoff
                    closest_content = content
        for content in contenders:
            if content.bottom < closest_content.top
                select (content)
```

Circle

In one embodiment, a circle is recognized if it is a group containing a single stroke, and if it's roundaboutness is greater than the experimentally determined value of 3.2. Roundaboutness is described by Allen Christian Long in "Quill: A Gesture Design Tool for Pen-based User Interfaces," University of California at Berkeley, Calif., No. 3044573, 2001.

Endpoint distance = the absolute value of the distance between the stroke's first and last points
Roundaboutness = (curve length) / (endpoint distance)

Pseudocode for One Embodiment of a Circle Recognition Process

```
def recognize_circle (ink_group):
    if ink_group.number_of_strokes !=1:
        return 0
    else:
        stroke = ink_group.get_stroke(0);
        roundaboutness = stroke.length / stroke.endpoint_distance
        if (roundaboutness > 3.2):
            return 1
        else:
            return 0
```

A circle's application is simple. In one embodiment, if a content item's bound box intersects with the circle's bounding box, then that content is included in the selection. In another embodiment, a more robust approach is used in which to intersect content bounding boxes with the convex hull of the scope mark.

Pseudocode for One Embodiment of a Circle Application

```
def recognize_circle (ink_group):
    if ink_group.number_of_strokes !=1:
        return 0
    else:
        stroke = ink_group.get_stroke(0);
        roundaboutness = stroke.length / stroke.endpoint_distance
        if (roundaboutness > 3.2):
            return 1
        else:
            return 0
```

One Embodiment of a Process for Recognizing a Persistent Selection

Figure 9:
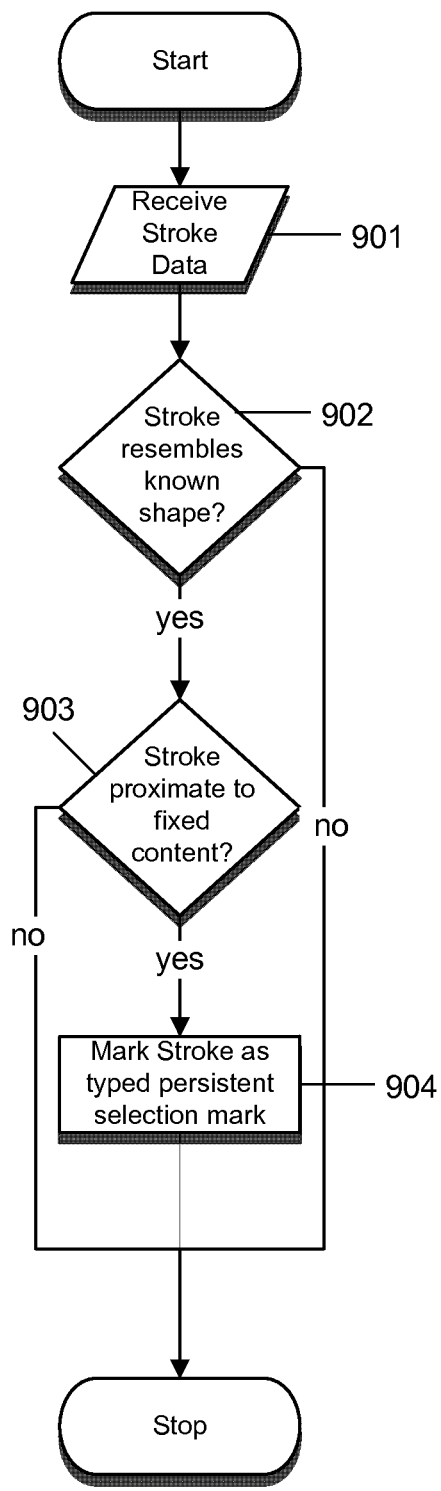
FIG. 9 is a flow diagram of one embodiment of a process for recognizing a persistent selection.

FIG. 9 is a flow diagram of one embodiment of a process for recognizing a persistent selection. The process is performed by processing logic that may comprise hardware (e.g., circuitry, dedicated logic, etc.), software (such as is run on a general purpose computer system or a dedicated machine), or a combination of both.

Referring to FIG. 9, the process begins by processing logic receiving stroke data (processing logic 901). Using stroke data, processing logic determines whether the stroke resembles a known shape (processing block 902). If not, the process ends. If the stroke does resemble a known shape, processing logic determines whether the stroke is proximate to fixed content (processing block 903). If not, the process ends. If the stroke is located proximate to fixed content, processing logic marks the stroke as typed persistent selection mark (processing block 904) and the process ends.

One Embodiment of a Process for Acting on a Persistent Selection Stroke

Figure 11:
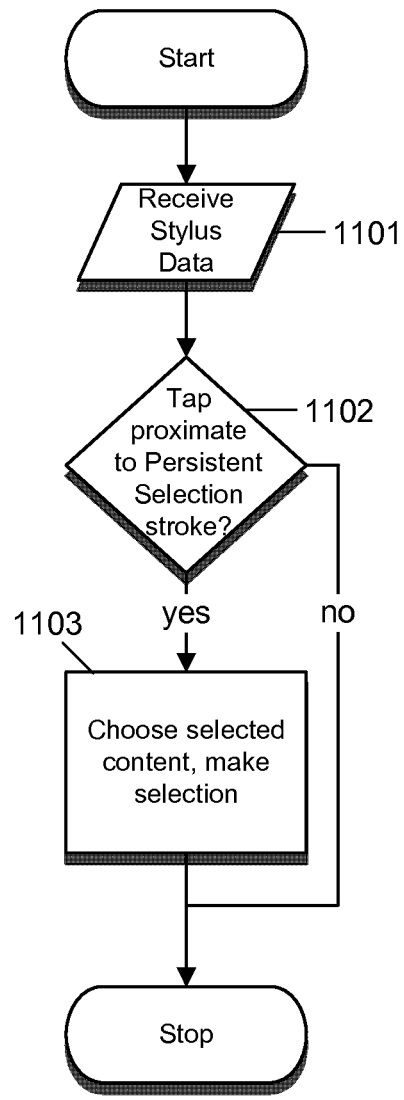
FIG. 11 is a flow diagram of one embodiment of a process for acting on a persistent selection stroke.

FIG. 11 is a flow diagram of one embodiment of a process for acting on a persistent selection stroke. The process is performed by processing logic that may comprise hardware (e.g., circuitry, dedicated logic, etc.), software (such as is run on a general purpose computer system or a dedicated machine), or a combination of both.

Referring to FIG. 11, the process begins by processing logic receiving stylus data (processing block 1101). Using the stylus data, processing logic tests whether a tap was made proximate to a persistent selection stroke (processing block 1102). If not, the process ends. If it has, processing logic chooses the selected content and makes a selection (processing block 1103). Thereafter, the process ends.

G Gesture

In order to demonstrate drawn commands in tandem with content delimited by existing scope marks, a simple G gesture may be used. This is the most complicated recognizer, employing five different attributes of the stroke. In one embodiment, all G gestures are in single-entry ink groups.

```
Area + area of the bounding box of the stroke
Curvature = Sum of curvature of a stroke. (left turns are negative)
Fat aspect = (bounding box's larger dimension) / (smaller dimension)
Skinny = 1.0 = fat aspect
Roundaboutness is the same as for circles.
```

If each of these attributes is within a certain range, the ink is considered to be a G gesture.

| Attribute Name | Min Value | Max Value |
|---|---|---|
| Area | 120 | 1500 |
| Curvature | Neg. Infinity | −1.05 |
| Skinny | 0.02 | 0.6 |
| Length | 30 | 80 |
| Roundaboutness | 2.5 | 7.0 |

The gesture (which is intended to show the definition of a word or the result of a Google web search) is associated with the nearest scope mark. In one embodiment, nearness is calculated using the Hausdorff spatial distance function between the gesture's bounding box and each scope mark's bounding box.

Pseudocode for One Embodiment of a 'G' Gesture Recognition Process

```
def recognize_command (ink_group):
    if ink_group.number_of_strokes 1= 1:
    return 0
    else:
        stroke = ink_group.get_stroke(O)
        box = stroke. bounding_box
        area = box. width * box. height
        curvature = stroke. signed_curvature
        fat_aspect = max(box.width, box. height) /
            min(box.width, box. height)
        skinny = 1 − fat_aspect
        length = stroke.length
        roundaboutness = stroke. length / stroke.endpoint_distance
        if (area is_between (120, 1500)    and
            curvature < −1.05              and
            skinny is_between (0.02, 0.6)  and
            length is_btween (30, 80)      and
            roundaboutness is_between (2.5, 7.0)):
            return 1
    else:
        return 0
```

Pseudocode for One Embodiment of a 'G' Gesture Activation Process

```
def activate_command (command_stroke, all_content):
    command_box = command_stroke.bounding_box
    closest_scope = nil
    closest_dist = infinity
```

```
        for scope in all_content.scope_marks:
            scope_box = scope.bounding_box
            v = hausdorff_distance(command_box, scope_box)
            if v < closest_dist:
                closest_scope = scope
                closest_dist = v
        activate_command_on_content (closest_scope.content( ))
```

An Example of a Computer System

FIG. 12 is a block diagram of an exemplary computer system that may perform one or more of the operations described herein. Referring to FIG. 12, computer system 1200 may comprise an exemplary client or server computer system. Computer system 1200 comprises a communication mechanism or bus 1211 for communicating information, and a processor 1212 coupled with bus 1211 for processing information. Processor 1212 includes a microprocessor, but is not limited to a microprocessor, such as, for example, Pentium™, PowerPC™, Alpha™, etc.

System 1200 further comprises a random access memory (RAM), or other dynamic storage device 1204 (referred to as main memory) coupled to bus 1211 for storing information and instructions to be executed by processor 1212. Main memory 1204 also may be used for storing temporary variables or other intermediate information during execution of instructions by processor 1212.

Computer system 1200 also comprises a read only memory (ROM) and/or other static storage device 1206 coupled to bus 1211 for storing static information and instructions for processor 1212, and a data storage device 1207, such as a magnetic disk or optical disk and its corresponding disk drive. Data storage device 1207 is coupled to bus 1211 for storing information (e.g., stroke data, mouse movements, content corresponding to selectable areas of documents) and instructions.

Computer system 1200 may further be coupled to a display device 1221, such as a cathode ray tube (CRT) or liquid crystal display (LCD), coupled to bus 1211 for displaying information to a computer user. An input device 1222 to input pen stroke data, as well as alphanumeric and other keys, may also be coupled to bus 1211 for communicating information and command selections to processor 1212. An additional user input device is cursor control 1223, such as a mouse, trackball, trackpad, stylus, or cursor direction keys, coupled to bus 1211 for communicating direction information and command selections to processor 1212, and for controlling cursor movement on display 1221.

Another device that may be coupled to bus 1211 is hard copy device 1224, which may be used for marking information on a medium such as paper, film, or similar types of media. Another device that may be coupled to bus 1211 is a wired/wireless communication capability 1225 to communication to a phone or handheld palm device.

Note that any or all of the components of system 1200 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for marking an electronic document with a pen, the method comprising:
receiving input representing one or more marks on a document image;
determining whether a first mark from the one or more marks represents a selection of a persistent selectable area that delineates information in the document image;
storing data corresponding to the selection to enable a user in the future to obtain the information in the document image by performing an action with respect to the one or more marks;
receiving an indication that the user has selected a second mark from the one or more marks;
determining if the second mark selected by the user is associated with an annotated command in response to the indication that the user has selected the second mark from the one or more marks;
determining that the annotated command of the second mark is associated with the persistent selectable area from among a plurality of distinct persistent selectable areas in the document image based on the determination of a minimum spatial distances between a first bounding box that encloses the second mark and a second bounding box, from among a plurality of distinct bounding boxes that enclose corresponding distinct persistent selectable areas, that encloses the persistent selectable area;
retrieving the information in the document image associated with the persistent selectable area in response to the indication that the user has selected the second mark from the one or more marks and based on the determination of the minimum spatial distance between the first and second bounding boxes; and
performing an action associated with the annotated command based on the information in the document image associated with the persistent selectable area, wherein the action associated with the annotated command is at least one of a web search for a subset of data in the persistent selectable area and a definition lookup for a subset of data in the persistent selectable area.

2. The method defined in claim 1 wherein the information comprises a portion of text.

3. The method defined in claim 1 wherein receiving input representing one or more marks on a document image comprises detecting one or more shapes that represent the persistent selectable area.

4. The method defined in claim 1 further comprising applying one or more other persistent action marks located in the document image in proximity to the selection when the action mark is tapped.

5. The method defined in claim 1 further comprising storing selection specific additional information for the action.

6. The method defined in claim 1 further comprising computing the selectable area of the document image.

7. The method defined in claim 1 further comprising:
receiving a second user's selection of the second mark at a time subsequent to creation of the second mark, the second user's selection made by touching the second mark while viewing the document image; and
selecting the persistent selectable area in the document image in response to the second user touching the selection mark.

8. The method defined in claim 1 wherein receiving inputs comprises recording a plurality of pen strokes and a plurality of time stamps, with a distinct one of the plurality of time stamps corresponding to a distinct one of the plurality of strokes.

9. The method defined in claim 8 further comprising storing the plurality of pen strokes, wherein related pen strokes are grouped together in storage based on a time when each pen stroke was applied, wherein a first pen stroke is related to a second pen stroke when a time duration between an end of the first pen stroke and a beginning of the second pen stroke is below a threshold based on a distance between a first location associated with the end of the first pen stroke and a second location associated with the beginning of the second pen stroke.

10. The method defined in claim 1 further comprising recording one or more user marks made within a distance of the selection mark.

11. A non-transitory computer-readable storage medium with instructions stored thereon which, when executed by a system, causes the system to perform a method comprising:
  receiving input representing one or more marks on a document image;
  determining whether a first mark from the one or more marks represents a selection of a persistent selectable area that delineates information in the document image;
  storing data corresponding to the selection to enable a user in the future to obtain the information in the document image by performing an action with respect to the one or more marks;
  determining whether a first mark from the one or more marks represents a selection of a persistent selectable area that delineates information in the document image;
  storing data corresponding to the selection to enable a user in the future to obtain the information in the document image by performing an action with respect to the one or more marks;
  receiving an indication that the user has selected a second mark from the one or more marks;
  determining if the second mark selected by the user is associated with an annotated command in response to the indication that the user has selected the second mark from the one or more marks;
  determining that the annotated command of the second mark is associated with the persistent selectable area from among a plurality of distinct persistent selectable areas in the document image based on the determination of a minimum spatial distances between a first bounding box that encloses the second mark and a second bounding box, from among a plurality of distinct bounding boxes that enclose corresponding distinct persistent selectable areas, that encloses the persistent selectable area;
  retrieving the information in the document image associated with the persistent selectable area in response to the indication that the user has selected the second mark from the one or more marks and based on the determination of the minimum spatial distance between the first and second bounding boxes; and
  performing an action associated with the annotated command based on the information in the document image associated with the persistent selectable area, wherein the action associated with the annotated command is at least one of a web search for a subset of data in the persistent selectable area and a definition lookup for a subset of data in the persistent selectable area.

12. The non-transitory computer-readable storage medium defined in claim 11 wherein the information comprises a portion of text.

13. The non-transitory computer-readable storage medium defined in claim 11 wherein receiving input representing one or more marks on a document image comprises detecting one or more shapes that represent the persistent selectable area.

14. The non-transitory computer-readable storage medium defined in claim 11 wherein the method further comprises applying one or more other persistent action marks located in the document image in proximity to the selection when the action mark is tapped.

15. The non-transitory computer-readable storage medium defined in claim 11 wherein the method further comprises storing selection specific additional information for the action.

16. The non-transitory computer-readable storage medium defined in claim 11 wherein the method further comprises computing the selectable area of the document image.

17. The non-transitory computer-readable storage medium defined in claim 11 wherein the method further comprises:
  the user selecting the selection mark by touching the selection mark while viewing the document image; and
  selecting the selectable area in the document image in response to the user touching the selection mark.

18. The non-transitory computer-readable storage medium defined in claim 11 wherein receiving inputs comprises recording a plurality of pen strokes and a plurality of time stamps, with a distinct one of the plurality of time stamps corresponding to a distinct one of the plurality of strokes.

19. The non-transitory computer-readable storage medium defined in claim 18 wherein the method further comprises storing the plurality of pen strokes.

20. The non-transitory computer-readable storage medium defined in claim 11 wherein the method further comprises recording one or more user marks made within a distance of the selection mark.

* * * * *